United States Patent [19] [11] 4,203,005
Fukuda et al. [45] May 13, 1980

[54] DIGITAL TYPE TELEPHONE SYSTEM HAVING A CONFERENCE FUNCTION

[75] Inventors: Takeo Fukuda; Hideaki Murayama, both of Yokohama, Japan

[73] Assignee: Tokyo Shibaura Denki Kabushiki Kaisha, Kawasaki, Japan

[21] Appl. No.: 919,917

[22] Filed: Jun. 28, 1978

[30] Foreign Application Priority Data

Jun. 29, 1977 [JP] Japan .................................. 52-77576

[51] Int. Cl.² ............................................. H04M 3/56
[52] U.S. Cl. ............................ 179/1 CN; 179/18 BC
[58] Field of Search ........... 179/1 CN, 15 AA, 18 BC

[56] References Cited

U.S. PATENT DOCUMENTS

| | | | |
|---|---|---|---|
| 3,882,276 | 5/1975 | Feiner et al. | 179/1 CN |
| 3,924,082 | 12/1975 | Oliver et al. | 179/1 CN |
| 3,983,332 | 9/1976 | Patten | 179/1 CN |

FOREIGN PATENT DOCUMENTS 128905 3/1975 Japan .................................. 179/1 CN Primary Examiner—Malcolm A. Morrison
Assistant Examiner—E. S. Kemeny
Attorney, Agent, or Firm—Oblon, Fisher, Spivak, McClelland & Maier

[57] ABSTRACT

This digital telephone conference system provides improved cancellation of reflective signals which cause echo-singing problems, such as caused by hybrid mismatches, for any number of telephone sets. Each telephone set is sequentially sampled for time sharing, and alternate samples are given opposite polarity signs before being summed, thereby making approximately half of the signals of opposite phase, for any number of telephone sets, for effective cancellation. Also, each member of the conference receives a sum signal of all telephone sets except his own.

12 Claims, 7 Drawing Figures

DIGITAL TYPE TELEPHONE SYSTEM HAVING A CONFERENCE FUNCTION

This invention relates to a digital type telephone system with a conference function which uses a plurality of telephone sets arranged on a time sharing basis.

An increasing demand has recently been made for a telephone system which an effect a telephone conference using a plurality of telephone sets. U.S. Pat. No. 3,882,276 discloses as such a telephone system a "conferencing system utilizing oppositely phased hybrids." The system includes a plurality of hybrids, each adapted to convert a 2-wire to a 4-wire operation. The hybrids are classified into two groups. The hybrids in one group include amplifiers for setting one polarity to reflective signals and the hybrids in the other group include amplifiers for setting an opposite polarity to reflective signals. In this system, reflective signals of opposite polarity are alloted to the two groups of hybrids in a telephone conference. According to this patent the reflective signals are reduced, thus enabling echo and singing margins to be increased.

In such a conventional system, it is indicated that only three persons at most can participate in such a telephone conference. More recently, there is a growing demand for a telephone system which permits six or more persons to participate in a telephone conference. As another problem, it is also indicated that reflective signals can not be effectively reduced, though dependent upon a combination of talkers in a telephone conference. In the conventional system, a fixed polarity is assigned to reflective signals resulting from hybrids. Where a number of persons participate in a conference, there may occur the situations in which telephone sets connected to hybrids having one polarity group are greatly different in their number from telephone sets connected to hybrids having the other polarity group i.e. an opposite polarity group. For this reason, reduction of reflective signals by mutual cancellation is not sufficiently effected, providing echo or singing problems.

Even if telephone sets connected to hybrids in one polarity groups are equal in their number to telephone sets connected to hybrids in the second polarity group, reflective signals resulting from the hybrids fairly vary from hybrid to hybrid due to a difference between an impedance as viewing the telephone set from the hybrid side and an impedance as viewing the trunk from the hybrid side, and no adequate cancellation of reflective signals often occurs in actual practice. Since as in the conventional telephone system, hybrids in one polarity group are connected to an extension of a PBX and hybrids in the other polarity group to a trunk, the magnitudes of reflective signals per se vary considerably from signal to signal, thus preventing sufficient cancellation of the reflective signals.

It is accordingly the object of this invention to provide a digital type telephone system which can effectively reduce reflective signals from hybrids irrespective of any combination of talkers in a telephone conference and increase echo or singing margins so that six or more people can participate in a telephone conference.

According to this invention there is provided a digital type telephone system adapted to cause digital speech signals from a plurality of telephone sets to be stored in a speech memory and, when out of stored speech signals those speech signals associated with a telephone conference are sequentially read out from the speech memory, to add the speech signals with an opposite polarity sign alternately attached to the speech signals in the order in which they are read out, and to store the added speech signals in the address positions of the speech memory except for the speech signal of his own which is eliminated from the added speech signals. In this invention each member in the conference receives the speech signals of all the talkers in the conference except for the speech signal of said member on a time-sharing basis. In this case, each of the reflective signals of the speech signals is added with a polarity opposite to that sign of a previously added reflective signal and in consequence reflective signals can be effectively cancelled.

Since reflective signals resulting from bybrids have their own values, they can be written during addition such that cancellation of reflective signals are effectively made. By so doing, reduction of reflective signals can be effectively effected irrespective of any combination of talkers in a telephone conference.

This invention will be further described by way of example by referring to the accompanying drawings in which.

Figure 5:
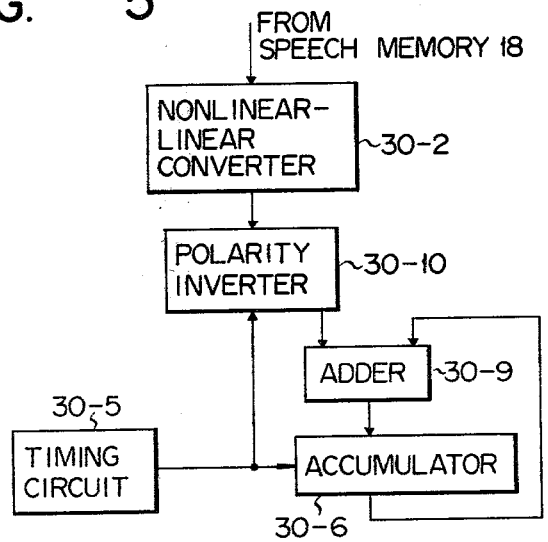
Figure 6:
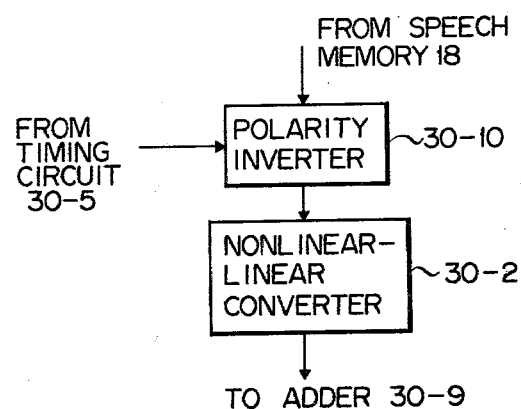

FIGS. 5 and 6, each, are another form of nonlinear-linear converter; and

Figure 3:
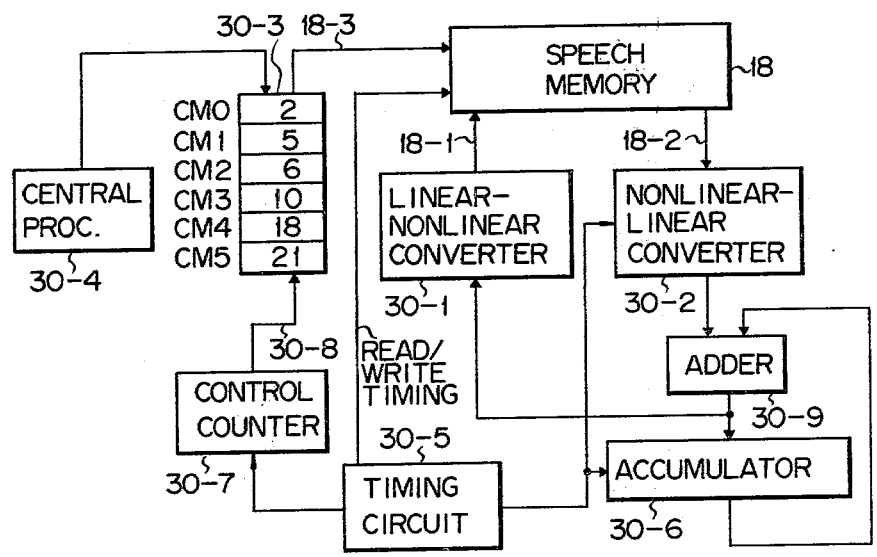
FIG. 3 is block circuit showing a detailed conference circuit of FIG. 1.
Figure 7:
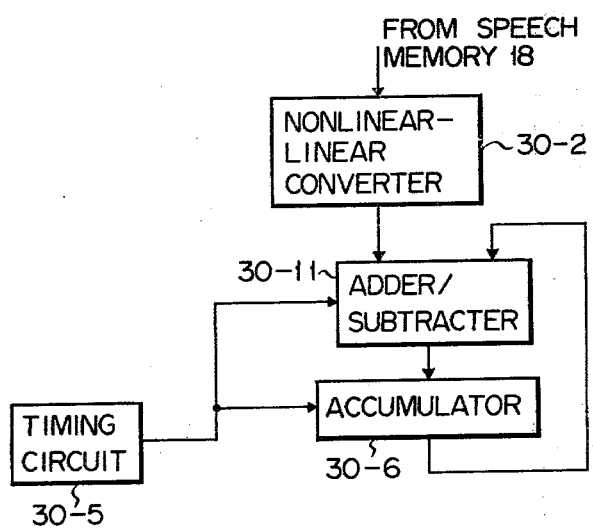

FIG. 7 is a block circuit using an adder/subtracter in place of an adder in the conference circuit of FIG. 3.

Figure 1:
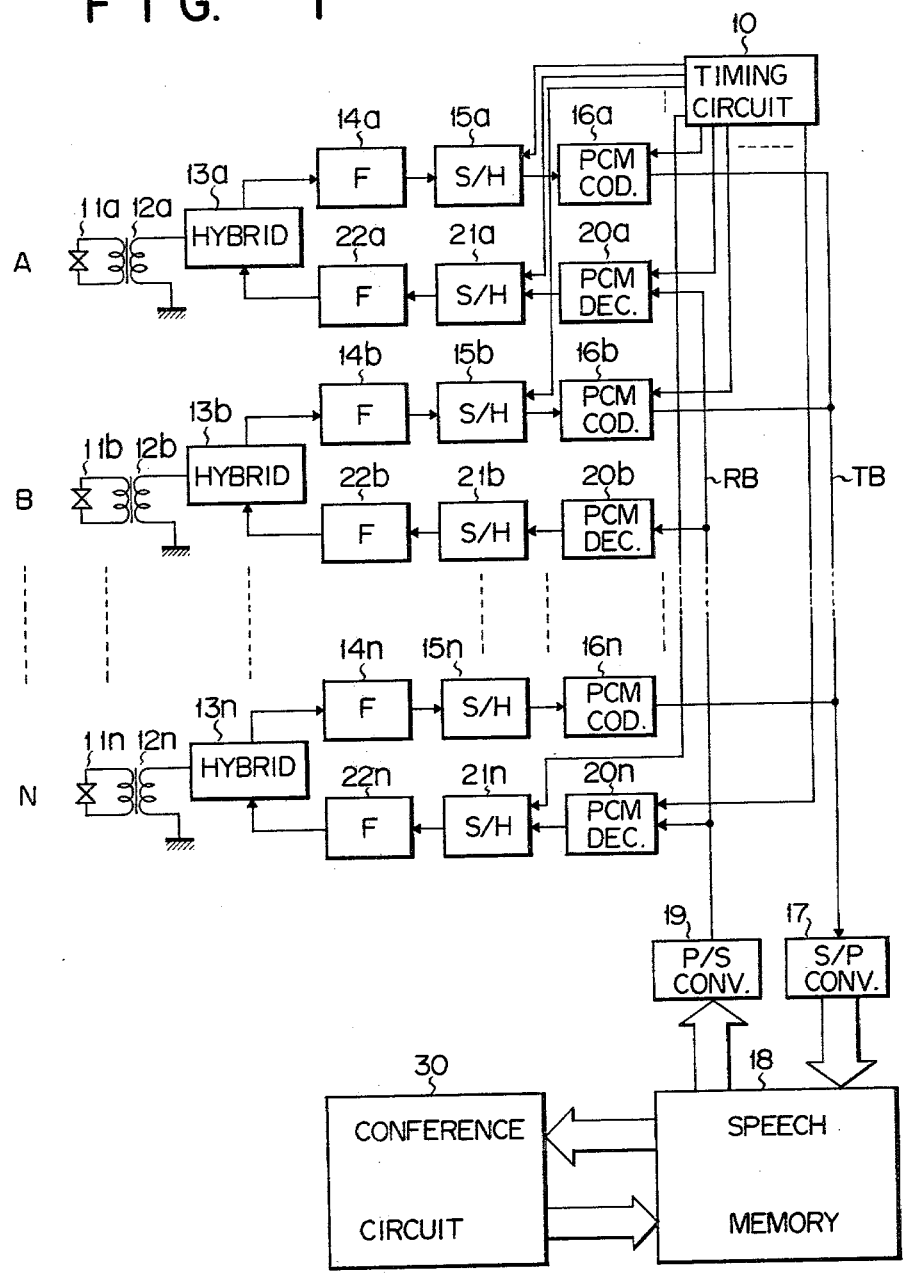
FIG. 1 is a block diagram showing a telephone system according to one embodiment of this invention.
Figure 2:
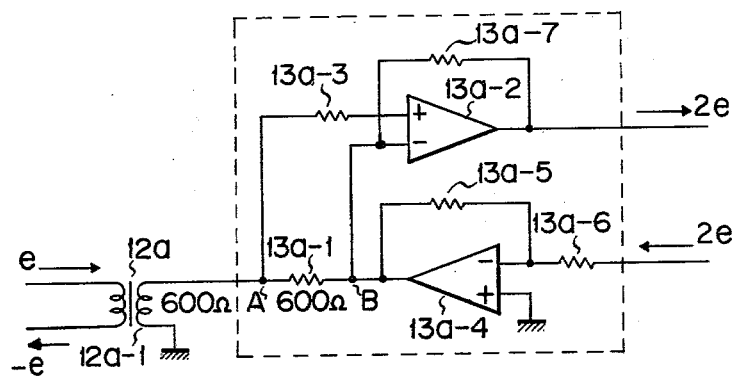
FIG. 2 is a circuit showing one form of a hybrid circuit.

FIG. 1 shows a digital type telephone system adapted to convert a speech signal from a telephone set to a PCM signal and transmit it. In FIG. 1, $11a$, $11b$, ... $11n$ show telephone sets connected respectively through matching transformers $12a$, $12b$, ... $12n$ to hybrids $13a$, $13b$, ... $13n$. The digital type telephone system of this invention permits a communication between two parties or a conference conversation among a desired number of persons. In actual practice, however, a greater number of telephone sets are arranged in the system. FIG. 1 shows a telephone system alone associated only with the telephone conference. The hybrids $13a$, $13b$, ... $13n$ are constructed, for example, as shown in FIG. 2. FIG. 2 shows a typical hybrid $13a$ by way of example. In FIG. 2 one end of a secondary winding $12a$-1 of a matching transformer $12a$ is grounded. The other end of the winding $12a$-1 is connected to one end of a resistor $13a$-1 constituting a 2-wire circuit side input terminal and through a resistor $13a$-3 to the non-inverting input terminal of an operational amplifier $13a$-2. The other end of the resistor $13a$-1 is connected to the output terminal of an operational amplifier $13a$-4. The output terminal of the operational amplifier $13a$-4 is fed back to the inverting input terminal of the operational amplifier $13a$-4 through a feedback resistor $13a$-5 and the non-inverting input terminal of the operational amplifier $13a$-4 is grounded. The inverting input terminal of the operational amplifier $13a$-4 is connected to one end of a resistor $13a$-6 which constitutes a 4-wire circuit side input terminal. The output terminal of the operational amplifier $13a$-4 is connected to the inverting input terminal of the operational amplifier 13a-2. An output terminal of the operational amplifier 13a-2 constitutes a 4-wire circuit side output terminal of the hybrid 13a and is connected through a feedback resistor 13a-7 to the inverting input terminal of the operational amplifier 13a-2.

Suppose that in the hybrid 13a the impedance of the secondary winding 12a-1 of the matching transformer 12a and the inpedance of the resistor 13a-1 are 600 ohms, respectively, the ratio of resistance R1 to R0 is 2 (R1/R0=2/1), and that the ratio of resistances R3 to R2 is 1 (R3/R2=1/1). When in this case a speech signal e is inputted from the telephone set 11a to the matching transformer 12a, a potential on the junction A of the resistor 13a-1 is e and a potential on the junction B of the resistor 13a-1 is 0. In consequence, the inverting side input of the operational amplifier 13a-2 is 0 and the non-inverting side input is e. Since signal gain in the amplifier 13a-2 is 2, the input e is amplified by the operational amplifier 13a-2 and an output signal 2e appears from the operational amplifier 13a-2.

When a signal 2e is inputted into the inverting input terminal of the operational amplifier 13a-4 a potential −2e appears on the junction B of the resistor 13a-1 and a potential −e on the junction A of the resistor 13a-1. In consequence, the inverting side input of the operational amplifier 13a-2 becomes 2e and the non-inverting side input of the operational amplifier 13a-2 becomes 2e. In this way, the inverting and non-inverting side inputs are cancelled with respect to each other, thereby theoretically preventing a reflective signal. In actual practice, however, the characteristic of the matching transformer is not ideal and the impedance of the telephone line is greatly departed from its rated value, causing a mismatching. It is impossible to completely prevent reflective signals. According to this invention, reflective signals resulting from such a cause can be effectively prevented.

Referring back to FIG. 1, the 4-wire side output terminals of the hybrids 13a . . . 13n are connected respectively through bandpass filters 14a . . . 14 i n to sample/hold circuits 15a . . . 15n. The sample/hold circuits 15a . . . 15n sample speech signals only during the respective time slot period corresponding to the telephone sets 11a . . . 11n, and hold them. Such a sampling is effected by a timing signal which is sent from a timing circuit 10. The signals of the sample/hold circuits 15a L . . . 15n are supplied to PCM coders 16a . . . 16n, where they are compressed and encoded to PCM signals. The PCM coders 16a . . . 16n are controlled by the timing signal from the timing circuit 10. The outputs of the PCM coders 16a . . . 16n are sent, in the serial mode, into a PCM TRANSMIT bus TB during the respective time slot period designated by the timing circuit 10. The PCM signal on the PCM TRANSMIT bus TB is, after converted through a serial/parallel converter 17 to a parallel signal with a predetermined bit length and thence to a speech memory 18. The speech signal stored in the speech memory 18 is subjected by a conference circuit 30 to signal processing to be described later, and stored again as a conference signal into the conference circuit 30. The conference signal is read out according to respective time slots which are arranged on a time-sharing basis and sent to a parallel/serial converter 19 where it is converted to serial data. The conference signal in the form of serial data is sent through a PCM RECEIVE bus RB to PCM decoders 20a . . . 20n designated by the time slot which is designated by the timing circuit 10. The PCM decoders 20a . . . 20n are controlled by the timing signal of the timing circuit 10 and an analog signal is obtained which has its bit length expanded by an amount corresponding to the extent to which the signal of the sample/hold circuit is compressed by the PCM coder. In this way, the PCM coders 16a . . . 16n and PCM decoders 20a . . . 20a are what is called "compander" type. The analog signals obtained are sampled and held by sample/hold circuits 21a . . . 21n adapted to be controlled by the timing signal from the timing circuit 10. Then, the signals are supplied through filters 22a . . . 22n to the 4-wire side input terminal of the hybrids 13a . . . 13n. As a result, the speech signals of all the talkers in the telephone conference except for the speech signal of his own are sent for reproduction.

The arrangement and operation of the conference circuit 30 will now be described below by referring to FIG. 3.

Now suppose that in the block circuit of FIG. 3 PCM signals corresponding to one frame are received and stored in the speech memory 18. The one frame is divided, for example, into 32 time slots and speech signals from the 32 telephone sets are sequentially arranged on a time sharing basis in one frame. In this case, a WRITE bus 18-1, READ bus 18-2 and address bus 18-3 are coupled to a linear-nonlinear converter 30-1, nonlinear-linear converter 30-2 and control memory 30-3, respectively. Out of the PCM speech signals stored in the speech memory 18 those signals relating to a conference conversation are read onto the conference circuit 30 and, after subjected to a predetermined add/subtract operation, again stored in the speech memory 18. At this time, the WRITE bus 18-1 and READ bus 18-2 are coupled to the PCM TRANSMIT bus TB and PCM RECEIVE bus RB and PCM signals corresponding to one frame are sent to the PCM TRANSMIT bus TB and inputted to designated PCM coders.

Now suppose that six persons (A, B, C, D, E and F) participate in a telephone conference.

| Participant/talker | TRANSMIT time slot | RECEIVE time slot | Memory address stored with PCM signals |
|---|---|---|---|
| A | 2 | 2 | 2 |
| B | 5 | 5 | 5 |
| C | 6 | 6 | 6 |
| D | 10 | 10 | 10 |
| E | 18 | 18 | 18 |
| F | 21 | 21 | 21 |

Memory addresses, 2, 5, 6, 10, 18 and 21 are written by a central processor 30-4 into the address positions CM0 . . . CM5, respectively, of the control memory 30-3. Thus, a telephone conference setting is made among the time slots 2, 5, 6, 10, 18 and 21. The conference circuit 30 is adapted to be controlled by a timing circuit 30-5 and the contents of an accumulator 30-6 are initialized into zero by a signal which is supplied from the timing circuit 30-5. By an initializing signal from the timing circuit 30-5 a control counter 20-7 sends a signal "0" into the address line 30-8 of the control memory 30-3. Since the memory address 2 is stored in the zeroth address location CM0 of the control memory 30-3, "2" appears on the output of the control memory 30-3. The signal "2" is sent through the address bus 18-3 to the speech memory 18. A PCM signal PA of the talker A (time slot 2) is stored in the second address position CM1 of the speech memory 18 and emerges on the READ bus 18-2. The PA signal is converted by the nonlinear-linear converter 30-2 into a linear signal LA without changing its polarity. The linear signal LA is supplied to an adder 30-9 where it is added with the content "0" of the accumulator 30-6. The resultant signal is stored into the accumulator 30-6.

By the next timing signal from the timing circuit 30-5 the control counter 30-7 sends a signal "1" into the address line 30-8 of the control memory 30-3. Since "5" is stored in the second address position CM1 of the control memory 30-3, "5" appears on the output address line 18-3 of the control memory 30-3 and address position "5" of the speech memory 18 is designated. Because a PCM signal PB of the talker B (time slot 5) is stored in the address position "5" of the speech memory 18, the signal PB is read from the speech memory 18 through the READ bus 18-2 and sent to the nonlinear-linear converter 30-2. The signal PB has its polarity inverted this time by a polarity control signal from the timing circuit 30-5 and a linear signal-LB is supplied from the nonlinear linear converter 30-2 to the adder 30-9 where it is added with the content LA of the accumulator 30-6. As a result, a signal LA-LB signal is stored in the accumulator 30-6.

In this way, PC, PD, PE and PF signals sequentially appear from the speech memory 18 into the READ bus 18-2. Where the output value of the control counter 30-7 is odd-numbered, it is inverted by the polarity control signal from the timing circuit 30-5 and a negative linear signal is outputted from the nonlinear-linear converter 30-2. In consequence, where the output value of the control counter 30-7 is "5", the content of the accumulator 30-6 will be

LA−LB+LC−LD+LE−LF=S

In this state an output appears from the timing circuit 30-5 the content of the counter 30-7 is again changed from "0" to "5" and signals PA . . . PF are again read out of the speech memory 18. Where the output value of the control counter 30-7 is zero or an even number, the signals PA . . . PF have their polarity inverted this time by the signal of the timing circuit 30-5 and the nonlinear-linear converter delivers a polarity-inverted signal. The content of the accumulator 30-6 has its final value S maintained this time by a signal from the timing circuit 30-5.

In consequence, with respect to the outputs 0 . . . 5 of the control counter 30-7, outputs S−LA, S+LB, S−LC, S+LD, S−LE and S+LF appear from the adder 30-9. These signals are supplied from the adder 30-9 to the linear-nonlinear converter 30-1 where they are converted to compressed PCM signals. Then, the compressed PCM signals are stored in the address positions 2, 5, 6, 10, 18 and 21 of the memory 18 and sent to the respective talkers A . . . F. That is, the respective talker receives a signal corresponding to the value of a sum of all the speech signals except for his own speech signal to permit a telephone conference. Since in this case a speech signal as sent to the talker is, for example, −PB+PC−PD+PE−PF, those reflective speech signal components corresponding to the respective talkers which are included in the signals PB . . . PF are mutually cancelled due to their polarities being opposite to each other. Even when a larger number of talkers participate in the conference, if they are even-numbered, a reflective signal resulting from one hybrid circuit at most is left and, if they are odd-numbered, reflective signals resulting from two hybrid circuits at most are left. According to this system, however, even when a greater number of talkers are involved, reflective signals resulting from the hybrid circuits can be always effectively cancelled.

Figure 4:
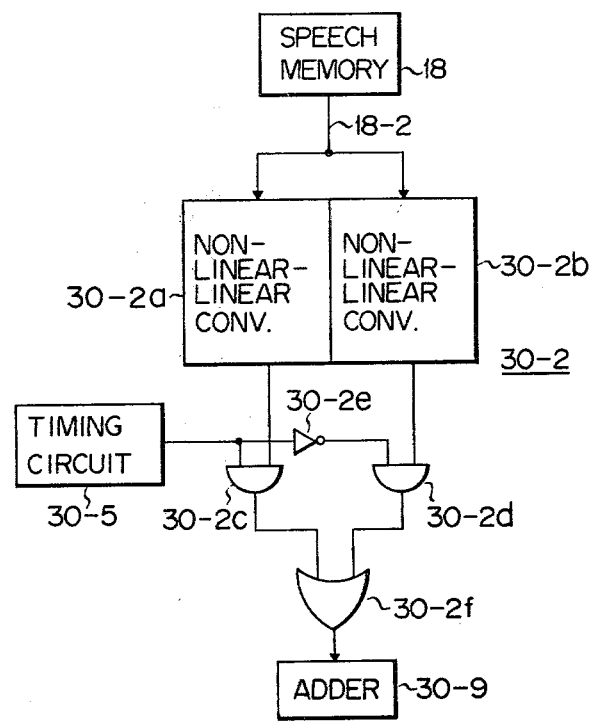
FIG. 4 is a block diagram showing one form of a nonlinear-linear converter in the conference circuit of FIG. 3.

Referring to FIG. 4 a circuit for alternatively giving an opposite polarity sign to speech signals appearing from the READ bus 18-2 according to the polarity control signal from the timing circuit 30-5 will be explained in more detail.

In FIG. 4 the nonlinear-linear converter 30-2 includes nonlinear-linear converter circuits of the same arrangement. The PCM speech signal read from the speech memory 18 onto the READ bus 18-2 is bifurcated and simultaneously supplied to the converters 30-2a and 30-2b. The converter 30-2a is of a type which converts the signal to a linear signal without changing the polarity of an input signal and the converter 30-2b is of a type which inverts the polarity of an input signal and converts it to a linear signal. The conversion of the polarity can be easily effected by inverting the sign of a sign bit. The outputs of the converters 30-2a and 30-2b are coupled to the inputs of AND gates 30-2c and 30-2d, respectively, and a polarity control signal from the timing circuit 30-5 is supplied to the other input of the AND circuit 30-2d through an inverter 30-2e and directly to the other input of the AND circuit 30-2c. The outputs of the AND gates 30-2c and 30-2d are sent through an OR gate 30-2f to the adder 30-9.

The circuit of FIG. 4 may take any arrangement if signals "1" and "0" are alternatively generated as a polarity control signal. For example, desired "1" and "0" signals can be readily obtained using a flip-flop. In this case, the flip-flop is adapted to invert signals in the timing of an instruction signal for reading out a speech signal from the memory 18. In this way, alternatively polarity-inverted speech signals are obtained from the OR gate 30-2f.

Although in the circuit arrangement shown in FIG. 4 use is made of a nonlinear-linear converter having a polarity inversion function, this invention can be equally practised by using a polarity inverter as shown in FIG. 5 which can select the polarity of a signal. In FIG. 5 the output of a nonlinear-linear converter 30-2 is supplied through a polarity inverter 30-10 to the adder 30-9. A polarity control signal is supplied from the timing circuit 30-5 to the polarity inverter 30-10. Each time the control signal is supplied, the polarity of a speech signal is inverted when passed through the polarity inverter 30-10. After passing through the polarity inverter 30-10 the speech signal can be supplied to the nonlinear-linear converter 30-2 as shown in FIG. 6.

Although in the circuits of FIGS. 4, 5 and 6 the speech signal has its polarity inverted before supplied to the adder 30-9, an adder/subtracter 30-11 may be used in place of the adder as shown in FIG. 7. In this case, the speech signals are alternately supplied by a polarity control signal from the timing circuit 30-5 to the add and subtract sections of an adder/subtracter 30-11.

Since speech signals relating to the conference conversation are written by the central processor 30-4 into the control memory 30-3, addresses should be effectively written in the order in which reflective signals resulting from hybrids are most effectively cancelled. This can be done, for example, by beforehand imparting information, such as the magnitudes of the reflective signals from the hybrids, to the central processor 30-4.

By so doing, cancellation of such reflective signals can be very effectively effected as compared with the conventional telephone system.

The configuration of the conference circuit 30 is not restricted to those explained above and all the function of the conference circuit 30 can be replaced using, for example, a fast-speed microcomputer. Where use is made of PCM coders and PCM decoders having, particularly, a fast-speed operation characteristic, a telephone system can be constructed without using a sample/hold circuit.

What we claim is:

1. A digital type telephone system comprising a plurality of telephone sets for generating speech signals of each member in a telephone conference, means for converting the speech signals into digital speech signals, means for attaching to the digital speech signals alternately opposite polarity signs, means for mutually adding the digital speech signals obtained from the sign attaching means and for storing in a respective address position added digital speech signals except for the digital speech signal of said each member, and means for sending the stored digital speech signals to corresponding telephone sets in the conference according to time slots which are arranged on a time sharing basis.

2. A digital type telephone system according to claim 1 comprising means for storing the digital speech signals individually, and means for sequentially reading out those stored digital speech signals associated with the conference.

3. A digital type telephone conference system comprising a plurality of telephone sets, means for converting speech signals from the telephone sets to respective digital speech signals according to respective time-shared time slots in a time frame, means for attaching to each of the respective digital speech signals a polarity sign opposite to that of the preceding respective digital speech signal, means for generating respective second speech signals corresponding to the sum of all digital speech signals occurring in a time frame, except for the speech signal of a respective telephone set, means for storing the generated speech signals in address positions corresponding to talkers in a conference, and means for reading out the stored speech signals according to the respective time-shared time slots and transmitting them to the talkers in the conference.

4. A digital type telephone conference system according to claim 3, further comprising means for sampling and holding speech signals from the respective telephone sets, according to the respective time-shared time slots, before being converted to digital speech signals by said means for converting speech signals; a speech memory for storing digital speech signals; and means for sequentially reading out the stored speech signals which are associated with a conference conversation, and attaching thereto the opposite polarity sign which is alternatively attached in the order in which the speech signals are read out.

5. A digital type telephone conference system according to claim 3, in which the digital signal converting means includes a compander type PCM coder.

6. A digital type telephone conference system according to claim 4, in which said readout means comprises a timing circuit for generating a timing signal, a control counter for counting outputs of the timing circuit, a control memory having a number of address positions corresponding to the number of talkers in a conference and adapted to have its addresses designated by an output of the control counter, and means for designating the address of said speech memory by the output of the control memory.

7. A digital type telephone conference system according to claim 3 in which said means for attaching further comprises first and second nonlinear-linear converters to which the speech signals are supplied, said first nonlinear-linear converter having no function of inverting the polarity of the speech signal and said second nonlinear-linear converter having a function of inverting the polarity of the speech signal, a gate circuit for alternatively taking the outputs of said first and second converters according to a polarity control signal from the timing circuit; and said means for generating further comprises an adder adapted to receive an output of said gate circuit, an accumulator for storing an output of the adder, and means for applying an output of said accumulator to the adder.

8. A digital type telephone conference system according to claim 3, in which said means for attaching further comprises a nonlinear-linear converter to which the speech signal is supplied, a polarity inverter for alternatively inverting the polarity of an output of the converter according to a polarity control signal of the timing circuit; and said means for generating further comprises means including an adder and accumulator which cumulatively add outputs of the polarity inverter.

9. A digital type telephone conference system according to claim 8 in which said polarity inverter is connected directly to an output of the speech memory.

10. A digital type telephone conference system according to claim 4 in which said means for attaching further comprises a nonlinear-linear converter to which the speech signals are supplied; an adder/subtracter to which outputs of the converter are supplied; means for setting the function of the adder/subtracter in accordance with a polarity control signal from a timing circuit; and an accumulator for cumulatively adding the output of the adder/subtracter.

11. A digital type telephone conference system according to claim 3, in which said storing means includes a linear-nonlinear converter to which an output of said means for generating is supplied.

12. A digital type telephone conference system according to claim 3 in which said means for reading out comprises a PCM decoder for decoding outputs of a speech memory into analog signals, means for sampling and holding outputs of the PCM decoder according to respective time-shared time slots, and a hybrid for connecting sampled and held signals to telephone sets in a conference.

* * * * *